United States Patent
Sar et al.

(10) Patent No.: US 12,488,313 B2
(45) Date of Patent: Dec. 2, 2025

(54) MINIMIZING AGGREGATE CARBON FOOTPRINT WITHIN GEOGRAPHICAL REGION

(71) Applicant: INTERNATIONAL BUSINESS MACHINES CORPORATION, Armonk, NY (US)

(72) Inventors: Sudhanshu Sekher Sar, Bangalore (IN); Sarbajit K. Rakshit, Kolkata (IN); Sudheesh S. Kairali, Kozhikode (IN); Satyam Jakkula, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 18/342,045

(22) Filed: Jun. 27, 2023

(65) Prior Publication Data
US 2025/0005511 A1 Jan. 2, 2025

(51) Int. Cl.
*G06Q 10/087* (2023.01)

(52) U.S. Cl.
CPC .................................. *G06Q 10/087* (2013.01)

(58) Field of Classification Search
USPC .......................................................... 705/28
See application file for complete search history.

(56) References Cited

U.S. PATENT DOCUMENTS

| 10,773,389 B2 | 9/2020 | Hitchcock et al. | |
|---|---|---|---|
| 2009/0292617 A1* | 11/2009 | Sperling | G06Q 30/06 705/26.1 |
| 2018/0262571 A1* | 9/2018 | Akhtar | A01G 25/16 |

(Continued)

FOREIGN PATENT DOCUMENTS

| IN | 202011046152 A | 12/2020 |
|---|---|---|
| WO | 2021210635 A1 | 10/2021 |

OTHER PUBLICATIONS

Zhang et al., Location optimization of a competitive distribution center for urban cold chain logistics in terms of low- carbon emissions, Computers & Industrial Engineering 154 (2021) Retrieved from Internet: https://www.sciencedirect.com/science/article/abs/pii/S0360835221000243, 13 pages.

(Continued)

*Primary Examiner* — Russell S Glass
(74) *Attorney, Agent, or Firm* — CHIP LAW GROUP

(57) ABSTRACT

A method, computer program product, and computer system for optimizing locations of micro-warehouses that minimize an aggregate carbon footprint within a geographical region. A first trained artificial intelligence model is used to extract, for a geographical region, a product demand of users located in the geographical region over a fixed time period, and delivery location clusters within the geographical region. The delivery location clusters output by the first trained artificial intelligence model is input into a regression model, the regression model outputting recommended locations of temporary micro-warehouses within the geographical region. A second trained artificial intelligence model is used to modify the recommended locations and output optimized locations based on reducing an aggregate carbon footprint caused by emissions resulting from transportation to and from the temporary micro-warehouses.

20 Claims, 7 Drawing Sheets

(56) References Cited

U.S. PATENT DOCUMENTS

2021/0224819 A1\* 7/2021 Silverstein ............. G06Q 50/04
2022/0067751 A1\* 3/2022 Sanchez ........... G06Q 10/08345

OTHER PUBLICATIONS

Davies, The carbon cost of home delivery and how to avoid it, Horizon The EU Research & Innovation Magazine, Retrieved from Internet: https://ec.europa.eu/research-and-innovation/en/horizon-magazine/carbon-cost-home-delivery-and-how-avoid-it, Feb. 17, 2020, 8 pages.

Gregory Healy, Why Pop-Up Warehousing is the Way Forward for Retail's Final-Mile Delivery, Jan. 30, 2019, Coliers Knowledge Leader, Retrieved from Internet: https://knowledge-leader.colliers.com/gregory-healy/pop-warehousing-way-forward-retails-final-mile-delivery/, 5 pages.

Alamsyah et al., Carbon Efficient Network Design: Evaluating the Trade-Offs Between Carbon Emissions, Transportation Cost, and Delivery Time for a Middle-Mile Distribution Network, Jun. 2021, Retrieved from Internet: https://dspace.mit.edu/bitstream/handle/1721.1/130976/Alamsyah_Purevdorj_project_Carbon%20Efficient%20Network%20Design.pdf?sequence=1&isAllowed=y, 79 pages.

Daniela Coppola, Distribution of e-commerce average greenhouse gas (GHG) emissions worldwide as of 2020, by source, Sep. 9, 2022, Retrieved from Internet: https://www.statista.com/statistics/1254302/e-commerce-average-emissions-by-source/, 4 pages.

Zhang et al., What's the size of your next-day delivery's carbon footprint?, updated May 4, 2021, Retrieved from Internet: https://www.rte.ie/brainstorm/2021/0323/1205657-next-day-delivery-online-shopping-carbon-footprint-climate-change-logistics/, 6 pages.

\* cited by examiner

МINIMIZING AGGREGATE CARBON FOOTPRINT WITHIN GEOGRAPHICAL REGION

BACKGROUND

The present invention relates to optimizing locations of micro-warehouses, and more specifically, to leveraging multiple models to improve an aggregate carbon footprint within a geographical region.

SUMMARY

Embodiments of the present invention provide a method, a computer program product, and a computer system, for optimizing locations of micro-warehouses that minimize an aggregate carbon footprint within a geographical region.

One or more processors of a computer system use a first trained artificial intelligence model to extract, for a geographical region, a product demand of users located in the geographical region over a fixed time period, and delivery location clusters within the geographical region. The delivery location clusters output by the first trained artificial intelligence model is input into a regression model, the regression model outputting recommended locations of temporary micro-warehouses within the geographical region. A second trained artificial intelligence model is used to modify the recommended locations and output optimized locations based on reducing an aggregate carbon footprint caused by emissions resulting from transportation to and from the temporary micro-warehouses, wherein the product demand of users located in the geographical region output by the first trained artificial intelligence model, the recommended locations output from the regression model, and a plurality of emission-based parameters are used as inputs for the second trained artificial intelligence model.

DETAILED DESCRIPTION

Overview

Figure 1:
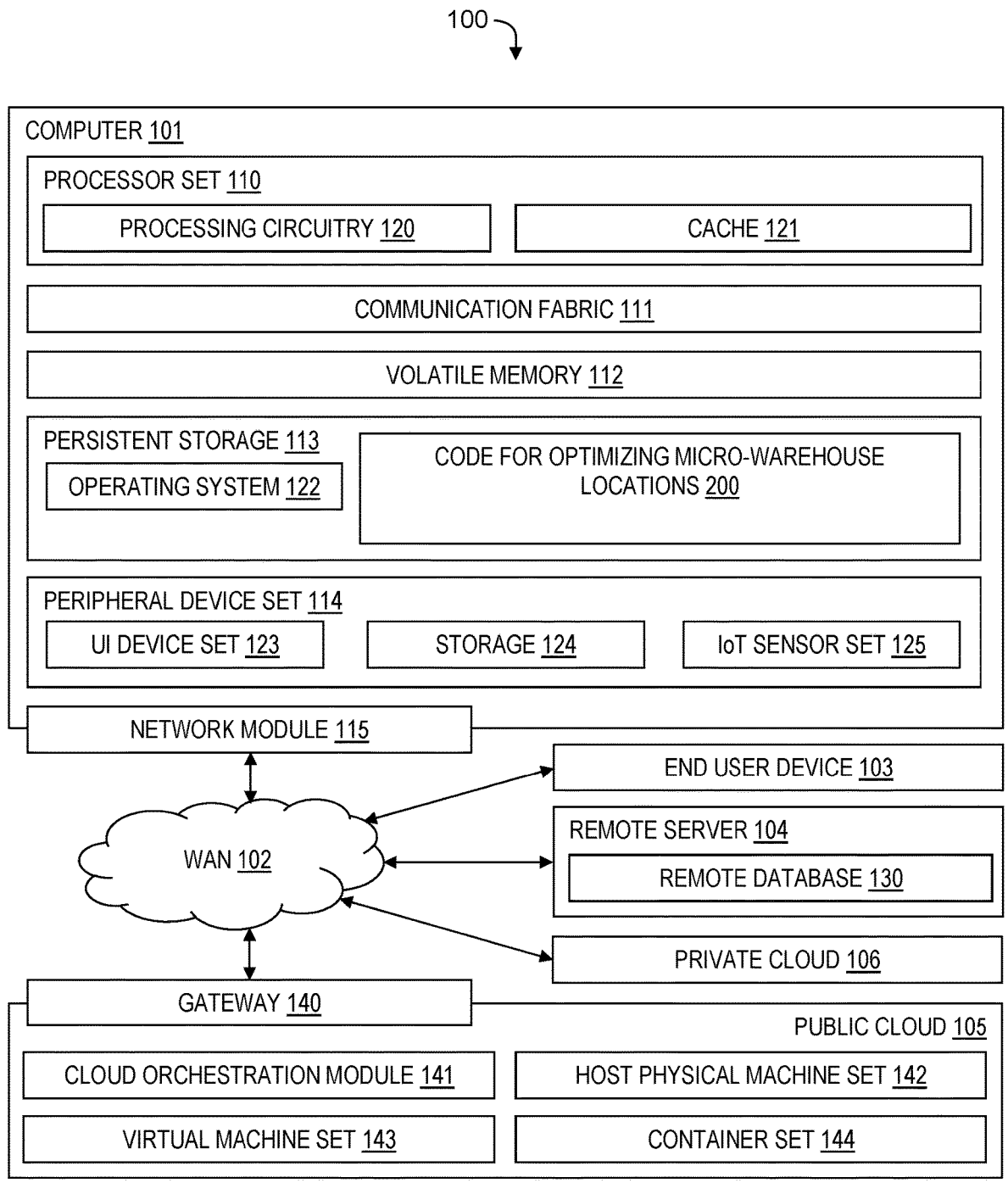
FIG. 1 depicts a computing environment which contains an example of an environment for the execution of at least some of the computer code involved in performing the inventive methods, in accordance with embodiments of the present invention.

Currently, emissions associated with transportation and delivery of goods purchased online contributes a significant percentage of total emission. As companies move to meet consumer's demands for quicker delivery, purchased goods are required to be packaged and shipped in smaller volumes, with fewer other goods packaged and shipped in the same operation. Additional trips between manufacturer, distributor, retail outlet, and/or consumer location result from the smaller volume shipments. Growing consumer expectations for next-day and same-day delivery options, especially in densely populated cities, lead to significant greenhouse gas emissions during the last-mile delivery stage. Last-mile delivery refers to the stage where a good is transported from a fulfillment center to its final destination, such as a consumer residence. Conventional last-mile delivery involves a centrally located warehouse that covers a large geographic region, where the packages are picked up and shipped long distances to the end customer; returns also follow the same transportation path back to the central warehouse. The transportation of packages from a single central warehouse to end customers over long distance significantly add to the aggregate carbon footprint of a geographical region.

An aggregate carbon footprint associated with last-mile deliveries within a geographical region can be reduced with the use of multiple artificial intelligence (AI) models. Embodiments of the present invention improve the aggregate carbon footprint associated with package delivery operations with AI by optimizing locations of pop-up micro-warehouses within the geographical region, using emissions-based inputs and predicted consumer demand. To reduce aggregated carbon footprint created due to all possible transport need of the products (e.g., manufacturer location to retail store, retail store to individual end customers, etc.), a first AI model forecasts consumer demand for products that could be stocked in temporary pop-up micro-warehouses located within a geographical region. The forecast can use a time-series model that predicts demand for products over a specific period of time, as demand and seasonality vary with time. Local events may also aid in the prediction. One of the outputs of the first AI model includes predictions of likely delivery locations, or clusters of potential delivery locations. The predicted delivery locations within the geographical region output by the first AI model is fed into a regression model, for example, employing a Least Square Method (LSM) algorithm to recommend locations of micro warehouses.

The regression model selects locations for micro-warehouses that are equidistant with respect to a given cluster of delivery locations; however, embodiments of the present invention leverage a second AI model to further optimize the locations of the micro-warehouses that will impact emissions of greenhouse gases so that the aggregate carbon footprint of the geographical region is reduced. The output of the regression model is input into the second AI model, along with output(s) from the first AI model, and emission-based parameter inputs to optimize the locations of the micro-warehouses within the geographical region based on lowering emissions, and not simply by distance. The emissions-based inputs for the second AI model consider weather information, road conditions, combinations of products and relative location of different end customers, traffic condition, an emission factor for a transport mode, a vehicle category of a user, a type of vehicle, and customer preferences with respect to carbon emissions. The second AI model modifies the output of the regression model (i.e. recommended locations) and outputs optimized locations based on reducing an aggregate carbon footprint caused by emissions resulting from transportation to and from the temporary micro-warehouses.

The optimized locations of the micro-warehouses are dynamically updated by leveraging the multiple AI models using new inputs driven by updated consumer demand over time.

Computing Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 depicts a computing environment which contains an example of an environment for the execution of at least some of the computer code involved in performing the inventive methods, in accordance with embodiments of the present invention. Computing environment 100 contains an example of an environment for the execution of at least some of the computer code involved in performing the inventive methods, such as code 200 for optimizing locations of micro-warehouses that minimize an aggregate carbon footprint within a geographical region. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Process and System for Optimizing Locations of Micro-Warehouses

Figure 2:
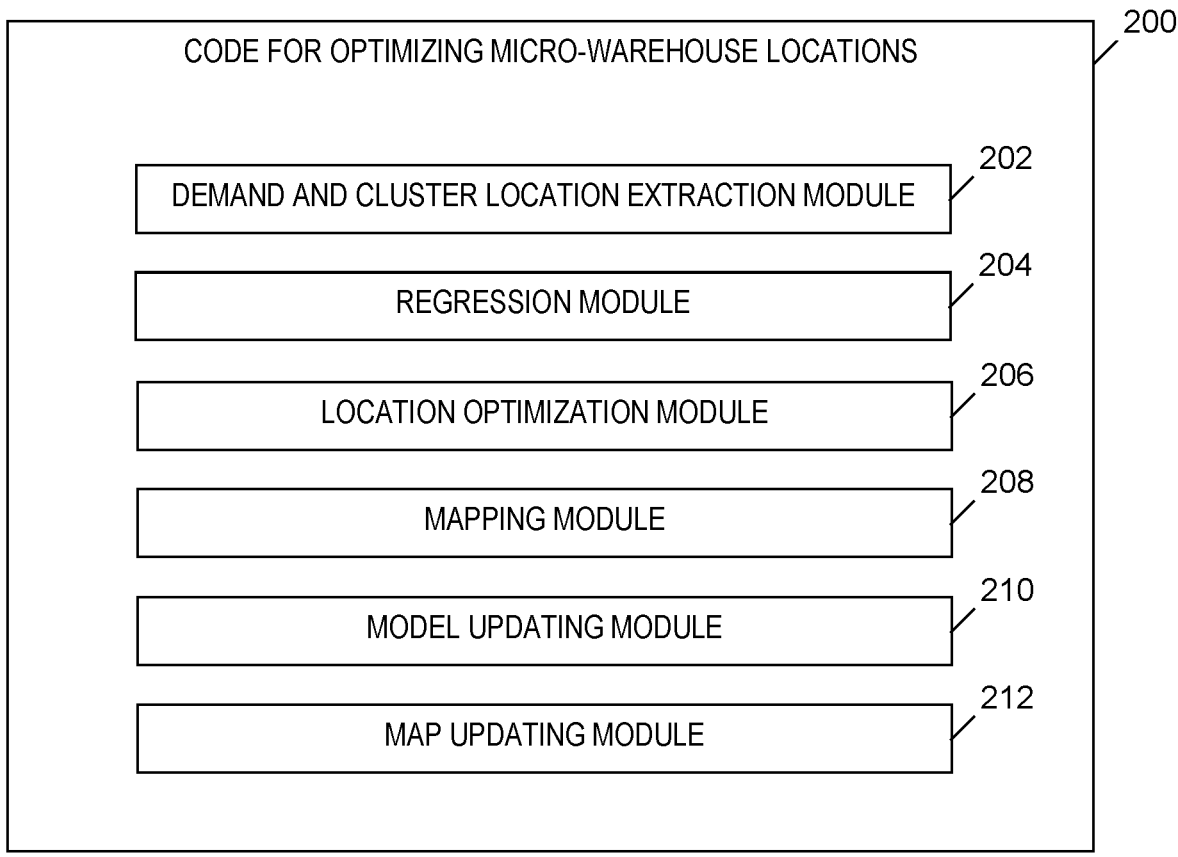
FIG. 2 is a block diagram of modules included in code included in the system of FIG. 1, in accordance with embodiments of the present invention

FIG. 2 is a block diagram of modules included in code included in the system of FIG. 1, in accordance with embodiments of the present invention. Code 200 includes a demand and cluster location extraction module 202, a regression module 204, a location optimization module 206, a mapping module 208, a model updating module 210, and map updating module 212. The number of modules can vary and some modules may be combined with other modules or separated into two or more modules. The functionality of the modules included in code 200 is discussed in detail in the discussion of FIG. 3, which is presented below.

Figure 3:
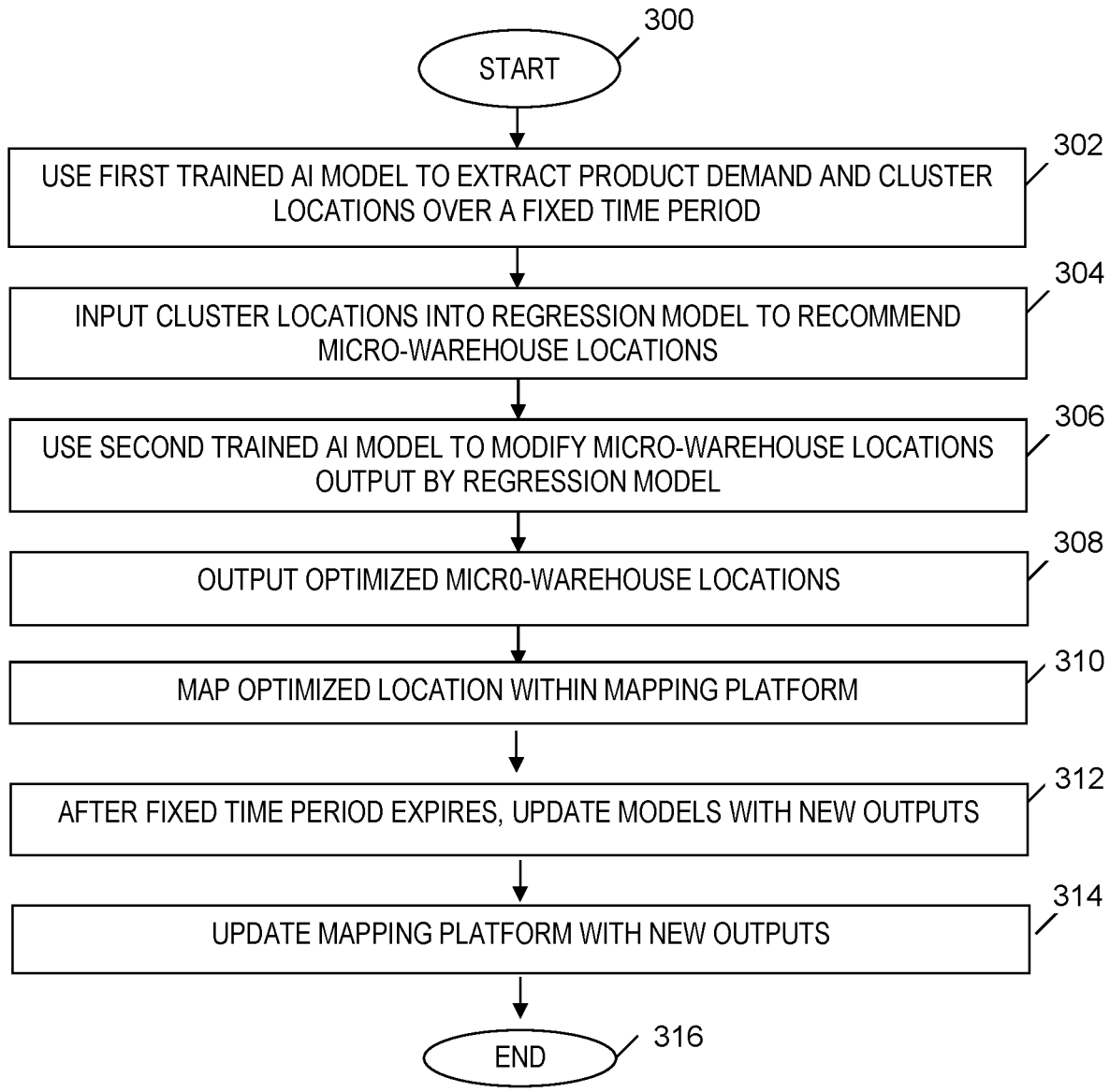
FIG. 3 is a flow chart of an embodiment of a method for optimizing locations of micro-warehouses that minimize an aggregate carbon footprint within a geographical region, in accordance with embodiments of the present invention.

FIG. 3 is a flow chart of an embodiment of a method for optimizing locations of micro-warehouses that minimize an aggregate carbon footprint within a geographical region, in accordance with embodiments of the present invention. The process of FIG. 3 begins at a start node 300.

In step 302, cluster location extraction module 202 (see FIG. 2) uses a first trained AI model to extract, for a geographical region, a product demand of users located in the geographical region over a fixed time period, and delivery location clusters within the geographical region. The inputs for the first trained AI model include structured and unstructured data, and may be obtained from one or more data sources internal to an organization or one or more data sources external to the organization. Exemplary inputs include user location, user purchase history, product information, seasonal trends, a length of time for the product demand forecast, e-commerce sales data, historical sales transaction data, purchase order history, social media content, government data, click streams, regional event schedules, demand for a product at a given point in time and seasonal trends. Any data relating to a user's purchase history, online activity, browsing history, etc. is voluntarily provided by the user with prior authorization and consent.

A first output of the first trained AI model is demand for one or more products over a given period time, within a geographical region. The period of time may be days, a week, weeks, a month, months, a year, and years. For example, the first trained AI model predicts that demand for product "A" will be high for the next two months in city "Y" due to a local festival in city "Y" that begins in six weeks and lasts for two weeks. In this example, the cluster location extraction module 202 inputs several data points into the first trained AI model, including: 1) a geographical region (e.g. city "Y"), 2) a desired window of time (e.g. two months), 3) an event calendar of city "Y" over the desired window of time, 4) social media posts from one or more multiple social media platforms from users located within the geographical region, and 5) historical purchase data of users located within the geographical region within a same window of time in previous years. Based on these inputs, the first trained AI model outputs: 1) product that will be in demand, 2) predicted number of units of the product that will be purchased and delivered within the geographical region, and 3) a duration of time that demand for the product will be high.

A second output of the first trained AI model is delivery location clusters within the geographical region, and can be based on the first output of the first trained AI model. For example, the first trained AI model predicts the locations of users living in city "Y" most likely to purchase product "A" and consolidates the locations into one or more likely delivery clusters within city "Y". In this example, the cluster location extraction module 202 inputs several data points into the first trained AI model, including: 1) anonymized social media profiles of users, 2) location information of user personal computing devices used to purchase product "A" in the past, and 3) historical last-mile delivery data for purchases of product "A" within city "Y". The data collected is anonymized so that an entity deploying the functionalities of the of the cluster location extraction module 202 will not know the identity or personal information of the users forming the cluster. Based on these inputs, the first trained AI model outputs likely delivery locations (e.g. house, business, dormitory, post office box, etc.) of product "A" within city "Y", which are then analyzed to determine if the likely delivery locations form clusters within city "Y". Each cluster represents a plurality of likely delivery locations that are grouped together based on a geographical proximity to other likely delivery locations. Continuing with the same example, if the local festival in city "Y" is attended mostly by university students, who are determined to have a high likelihood to purchase product "A," then the delivery location clusters within city "Y" may be near different university campuses across city "Y."

With these outputs, the cluster location extraction module 202 knows which product(s) will be in demand within a geographical region, how long the product will be in demand, and where the likely last-mile deliveries of the product will occur. Conventionally, a central warehouse is stocked with product predicted to be in demand and is delivered from the central warehouse to the delivery locations. Transporting the product with delivery vehicles to many different delivery locations from one central warehouse causes significant emissions. One way to reduce such emissions is to set up temporary, pop-up micro-warehouses within the geographical region that stock the product determined to be in demand so that distances travelled to deliver the product are reduced. Pop-up micro-warehouses can be existing structures capable of receiving and storing product until the product is picked up and delivered to a delivery location. As an example, a micro-warehouse can be a personal residence, an office space, a warehouse, and the like. Pop-up micro-warehouses can also be temporary structures constructed at a recommended location and then deconstructed and re-constructed at a new recommended location. As an example, a micro-warehouse can be a tent, canopy, temporary shelter, festival tent, and the like capable of receiving and storing product until the product is picked up and delivered to a delivery location. The ideal locations of the micro-warehouses should be selected with the goal to minimize a carbon footprint associated with delivery transport of products between micro-warehouses and delivery locations.

In step 304, regression module 204 inputs the delivery location clusters output by the first trained AI model into a regression model to output recommended locations of temporary micro-warehouses within the geographical region. In an exemplary embodiment, the regression model is a least square method (LSM) that determines recommend locations based on the predicted delivery location clusters. Let $(t_1, y_1)$, $(t_2, y_2)$, ..., $(t_n, y_n)$ denote a given time series (e.g. t1 denotes week-1, t2 denotes week-2, etc.) and y1 denotes the demand for a particular product (e.g. product "A"). Then, $y=a+bx$, where a is the intersect and b is the independent variable, which provides a recommended geographical location for micro-warehouses that are equidistant with respect to a given cluster of delivery locations.

Figure 4:
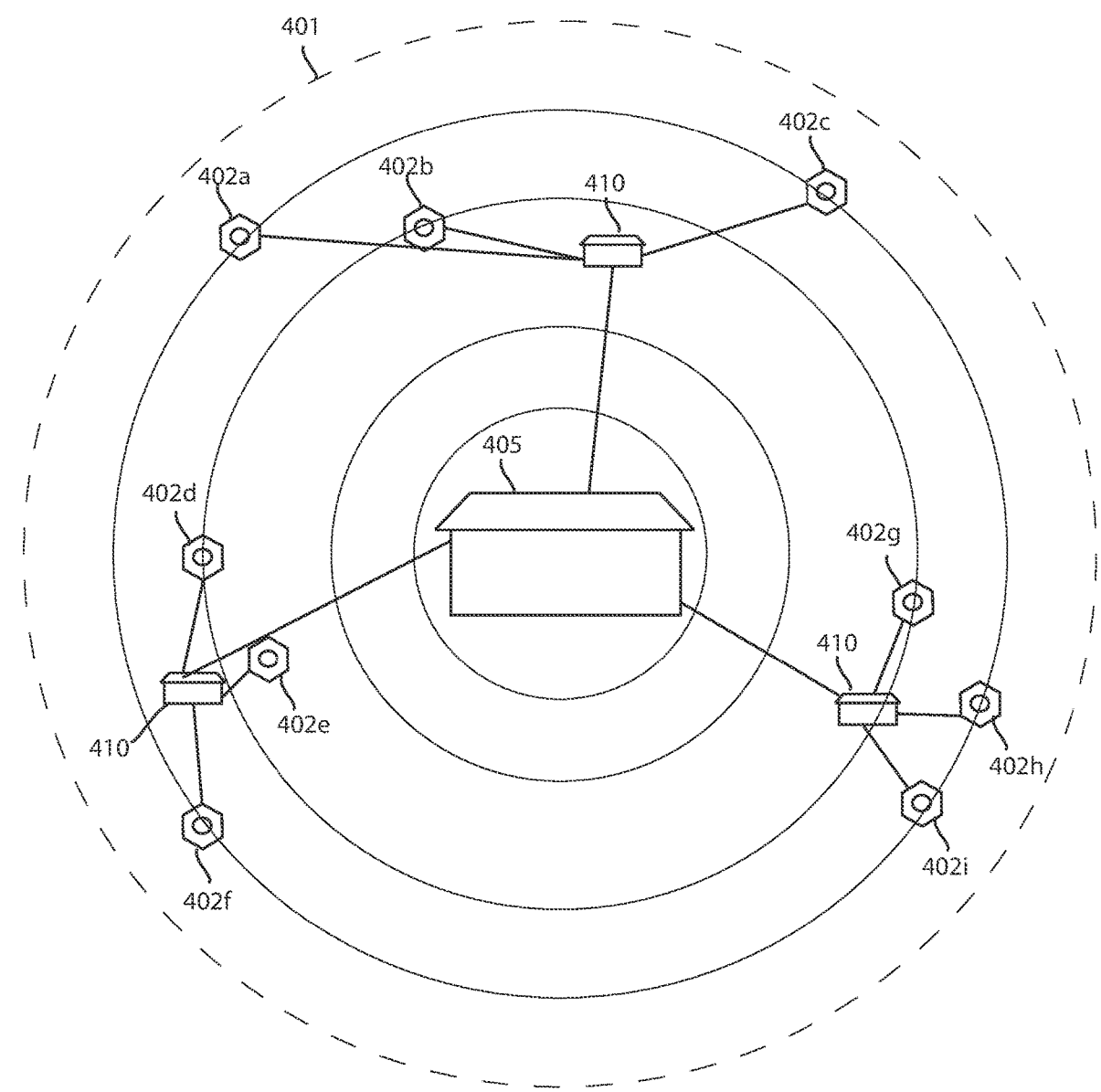
FIG. 4 depicts recommended locations of micro-warehouses output by a regression model, in accordance with embodiments of the present invention.

The optimized locations of temporary micro-warehouses output by the regression model are mapped within a mapping platform to display the optimized locations within the geographical region. FIG. 4 depicts recommended locations of micro-warehouses output by a regression model, in accordance with embodiments of the present invention. In the illustrated embodiment, six clusters 402a-i are output by the first trained AI model and are shown within a geographical region 401. Using the regression model with the cluster locations 401a-i as input, locations of micro-warehouses 410 are recommended and mapped within the geographical region 401. The recommend locations of three micro-warehouses 410 are shown in FIG. 4. The recommended locations represent geographical locations determined to be a best fit for the set of cluster points input into the regression model that minimizes the sum of the offsets between cluster points. For instance, the regression model selects locations for micro-warehouses that are equidistant with respect to a given cluster of delivery locations; however, embodiments of the present invention leverage a second AI model to further optimize the locations of the micro-warehouses that will impact emissions of greenhouse gases so that the aggregate carbon footprint of the geographical region is reduced.

In step 306, the location optimization module 206 uses a second trained AI model to modify the recommended locations based on reducing an aggregate carbon footprint caused by emissions resulting from transportation to and from the temporary micro-warehouses. The inputs for the second trained AI model include: 1) product demand of users located in the geographical region output by the first trained AI model, 2) the recommended locations output from the regression model, and 3) a plurality of emission-based parameters. The plurality of emission-based parameters include road conditions, weather conditions, traffic conditions, an emission factor for a transport mode, a vehicle category of a user, a type of vehicle, customer preferences with respect to carbon emissions, and kilogram of carbon dioxide equivalent.

Road conditions refer to elevation changes, grade, pavement type, a path of the road (e.g. curvy or straight), and the like, which can impact emissions. For example, the road(s) needed to travel between a micro-warehouse and a delivery location might have a large elevation change, which requires more work from the vehicle engine and ultimately more carbon emissions. Paved road(s) are more efficient for travel than non-paved roads, and travelling down straight roads consumes less fuel than travelling down curved roads. Road conditions, such as road profiles can be retrieved from databases such as a geographic information system (GIS) database.

Weather conditions impact fuel economy and carbon emissions if the road surface is wet, slippery, snow-covered, and the like. Weather conditions can be retrieved from weather models and weather forecast models.

Traffic conditions refer to road congestion, likelihood of traffic jams at a given point in time, road construction, and the like. Traffic conditions impact carbon emissions, for example, if the journey takes longer and the vehicle is idling for longer in traffic. Traffic conditions can be retrieved from traffic reports, software applications that provide updates on traffic, traffic prediction models, live camera feeds, and the like.

An emission factor for a type of delivery vehicle refers to estimated emissions based on a type of vehicle. The types of vehicles are categorized as light-duty vehicles (e.g. passenger cars), light-duty trucks (e.g. two axle, four tire), heavy-duty vehicles (trucks with more than two axles or four tires), and motorcycles. Emissions factors are averages of total hydrocarbons, exhaust carbon monoxide, exhaust nitrogen oxides, exhaust particulate matter with diameter≤ 2.5 micrometers, brakewear particulate matter with diameter≤2.5 micrometers, and tirewear particulate matter with diameter≤2.5 micrometers. These averages are based on national average age distributions, vehicle activity (speeds, operating modes, vehicle-miles traveled fractions, starts and idling), temperatures, inspection/maintenance and antitampering programs, and average gasoline fuel properties in that calendar year. Total hydrocarbons include exhaust and evaporative emissions. The emission factor of the vehicle used for delivery of a package to a delivery location can be retrieved from the data sources output by the U.S. Department of Transportation, for example.

Customer preferences with respect to carbon emissions can influence the location of the micro-warehouses. If most customers within a geographical region prefer reduced carbon emissions over speed of delivery, the locations of the micro-warehouses may be different than if most customers prefer speed of delivery over carbon emission reduction.

In step 308, the location optimization module 206 outputs optimized locations. For instance, the second trained AI model modifies the recommended locations of micro-warehouses based on the: 1) product demand of users located in the geographical region output by the first trained AI model, 2) the recommended locations output from the regression model, and 3) the plurality of emission-based parameters, so that the locations of the micro-warehouses minimize the carbon footprint associated with the delivery of packages within the geographical region.

Figure 5:
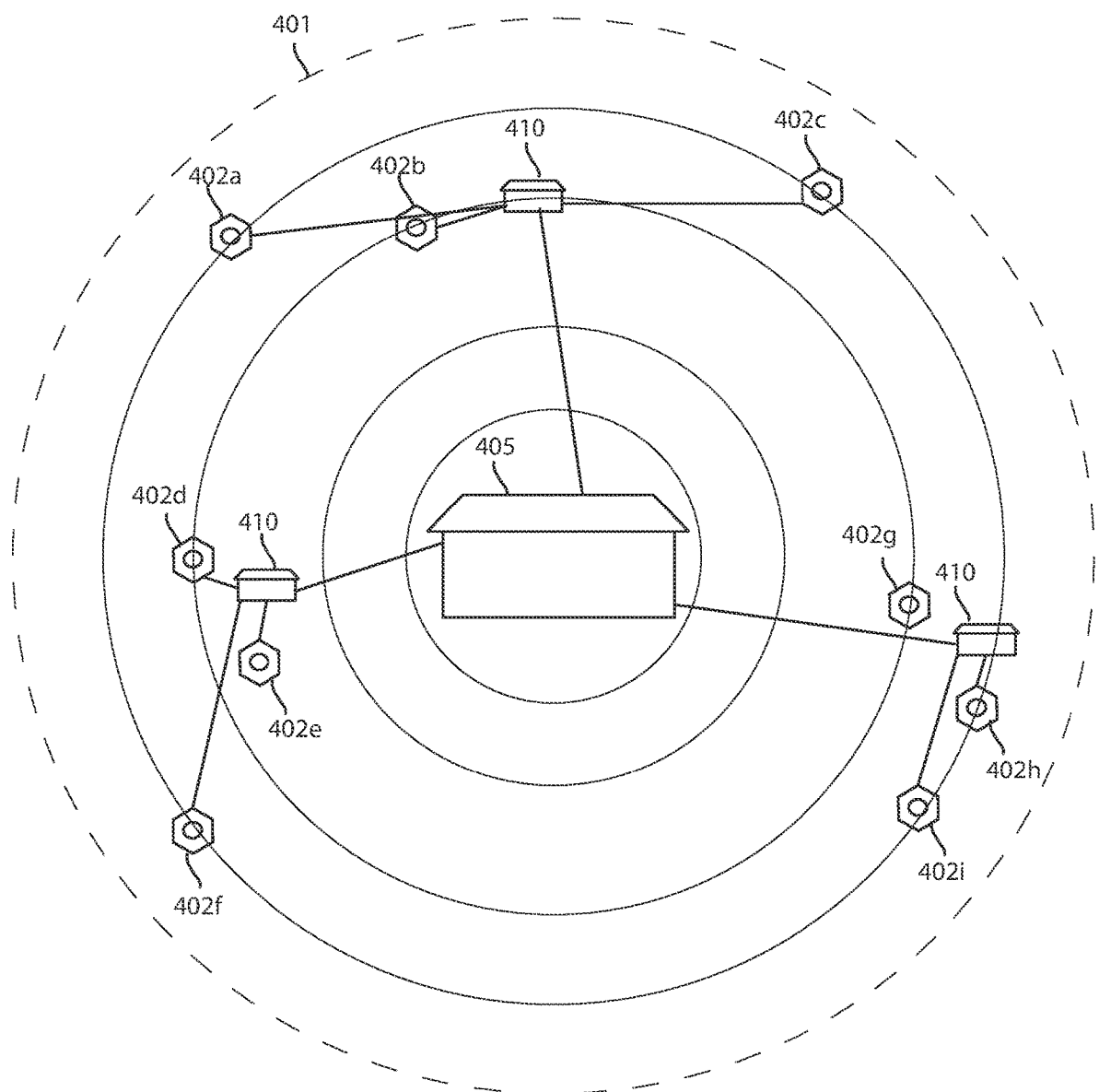
FIG. 5 depicts optimized locations of micro-warehouses output by an AI model using inputs from other models, in accordance with embodiments of the present invention.

FIG. 5 depicts optimized locations of micro-warehouses output by the second AI model using inputs from other models, in accordance with embodiments of the present invention. As shown in FIG. 5, the locations of the micro-warehouses 410 are different than the locations of the micro-warehouses recommend and illustrated in FIG. 4, although the locations of the delivery location clusters 402a-i are the same within the geographical region 401. The difference in location of the micro-warehouses 410 is the result of the second trained AI model considering the emission-based parameters in addition to the product demand output by the first trained AI model and the "best fit" locations output by the regression model. In the illustrated embodiment, the optimized locations of the micro-warehouses 410 are not equidistant between delivery location clusters 402a-i and rather are located closer to one cluster (e.g. 402b) than to another cluster (402c) because locating the micro-warehouse closer to cluster 402b causes less emission overall. One reason could be that the road(s) leading to cluster 402c from the micro-warehouse 410 are highway roads (e.g. paved, no stop and go traffic, generally straight), and that little to no elevation changes exist between micro-warehouse 410 and cluster 402c, whereas the road(s) between the micro-warehouse 410 and the cluster 402b are damaged and require several turns to accommodate a large change in elevation. Another reason could be that light duty passenger cars are used for deliveries to the region surrounding cluster 402c whereas heavy duty trucks are used for deliveries in the region of cluster 402b.

Continuing with the above example, FIG. 5 depicts delivery cluster locations 402a-i within city "Y" representing users predicted to purchase and have product "A" delivered within the next two months of time. The locations of the micro-warehouses 410 are optimized so that the carbon footprint associated with delivering product "A" to the users is minimized. The number of micro-warehouses 410 and requirements of the micro-warehouses 410 is also output by the second AI model. The output of the first trained AI model provides estimates of the number of product "A" will be sold, and thus a number of micro-warehouses 410 to recommend for satisfactorily delivering product "A" can be calculated, along with size and capacity requirements of the micro-warehouse 410.

In step 310, mapping module 208 maps the optimized locations of temporary micro-warehouses within a mapping platform to display the optimized locations within the geographical region. The mapping platform may be a map and/or navigation application or service that allowed the locations to be visualized on a computer display screen along with turn-by-turn directions.

In step 312, model updating module 210 updates the models with new inputs. For instance, after the fixed time period expires, model updating module 210 leverages the first trained AI model to output a new product demand of the users located within the geographical region and new delivery locations. For example, the first trained AI model predicts that demand for product "B" will be high for the next two weeks in city "Y" due to weather warming up in city "Y" that lasts for three months. In this example, the cluster location extraction module 202 inputs several data points into the first trained AI model, including: 1) a geographical region (e.g. city "Y"), 2) a desired window of time (e.g. two weeks), 3) seasonal fashion trends, 4) climate data of city "Y", and 5) historical purchase data of users located within the geographical region within a same window of time in previous years. Based on these inputs, the first trained AI model outputs: 1) new product that will be in demand, 2) predicted number of units of the new product that will be purchased and delivered within the geographical region, and 3) a duration of time that demand for the new product will be high.

The first trained AI model predicts the locations of users living in city "Y" most likely to purchase product "B" and consolidates the locations into one or more likely delivery clusters within city "Y". In this example, the cluster location extraction module 202 inputs several new data points into the first trained AI model, including: 1) anonymized social media profiles of users, 2) location information of user personal computing devices used to purchase product "B" in the past, and 3) historical last-mile delivery data for purchases of product "B" within city "Y". Based on these new inputs, the first trained AI model outputs likely delivery locations (e.g. house, business, dormitory, post office box, etc.) of product "B" within city "Y", which are then analyzed to determine if the likely delivery locations form clusters within city "Y".

The new delivery location clusters output by the first trained AI model are inputted into the regression model. The regression model outputs updated recommended locations of new temporary micro-warehouses within the geographical region. The second trained AI model is used to modify the updated recommended locations and output updated optimized locations based on reducing an aggregate carbon footprint caused by emissions resulting from transportation to and from the new temporary micro-warehouses. The inputs for the second trained AI model are now the new product demand of users located in the geographical region output by the first trained AI model, the updated recommended locations output from the regression model, and the plurality of emission-based parameters.

Figure 6:
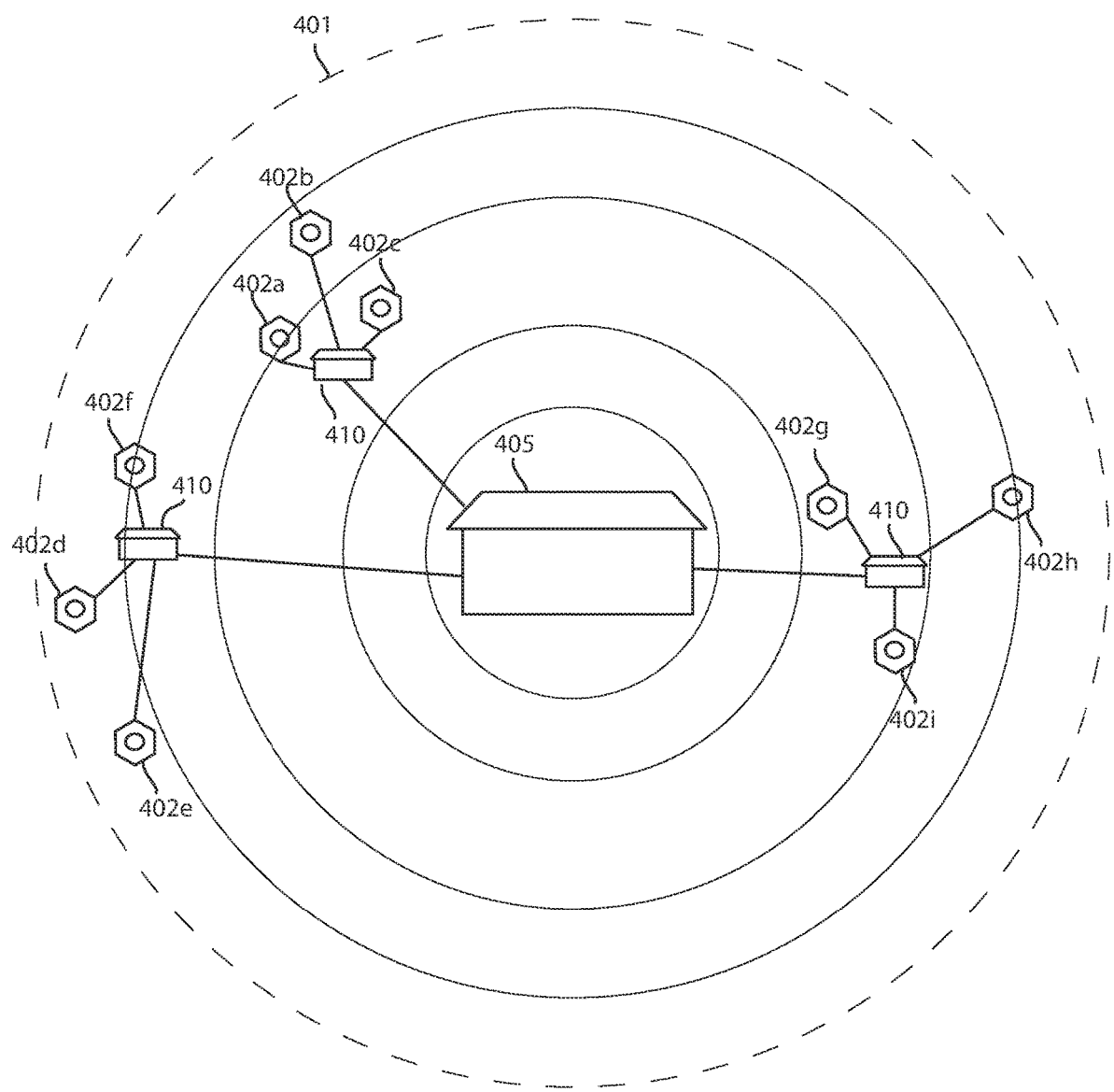
FIG. 6 depicts updated optimized locations of micro-warehouses output by the AI model using new inputs from other models, in accordance with embodiments of the present invention.

The updated optimized locations are different from the optimized locations, as shown in FIG. 6, which depicts updated optimized locations of micro-warehouses output by the second AI model using new inputs from other models, in accordance with embodiments of the present invention. In the illustrated embodiment, delivery cluster locations 402a-i within city "Y" represent users predicted to purchase and have product "B" delivered within the next two weeks of time. The locations of the micro-warehouses 410 are optimized so that the carbon footprint associated with delivering product "B" to the users is minimized. The number of micro-warehouses 410 and requirements of the micro-warehouses 410 is also output by the second AI model. The output of the first trained AI model provides estimates of the number of product "B" will be sold, and thus a number of micro-warehouses 410 to recommend for satisfactorily delivering product "B" can be calculated, along with size and capacity requirements of the micro-warehouse 410.

Although the system has been described separately for two products, it is to be understood that the models can output a demand for more than one product and delivery cluster locations for more than one product simultaneously such that the locations of the micro-warehouses can be optimized for more than one product.

Further, the model updating module 210 may update model with respect to the same product (e.g. product "A") to continuously adjust and update demand for the product beyond a first window of time, which require new locations for micro-warehouses. For example, the model updating module 210 re-inputs the data sets one month into the initial two month desired period of time. The first trained AI model predicts that demand for product "A" will remain high for longer than initially predicted, or less than initially predicted. This output can be fed into the second AI model as described above to alter the optimized micro-warehouse location previously output by the second AI model.

In step 314, the map updating module 212 updates the mapping platform with the updated optimized locations. The display is thus augmented to superimpose new locations on the digital map of the geographical region.

Relationship Between Artificial Intelligence Models

Figure 7:
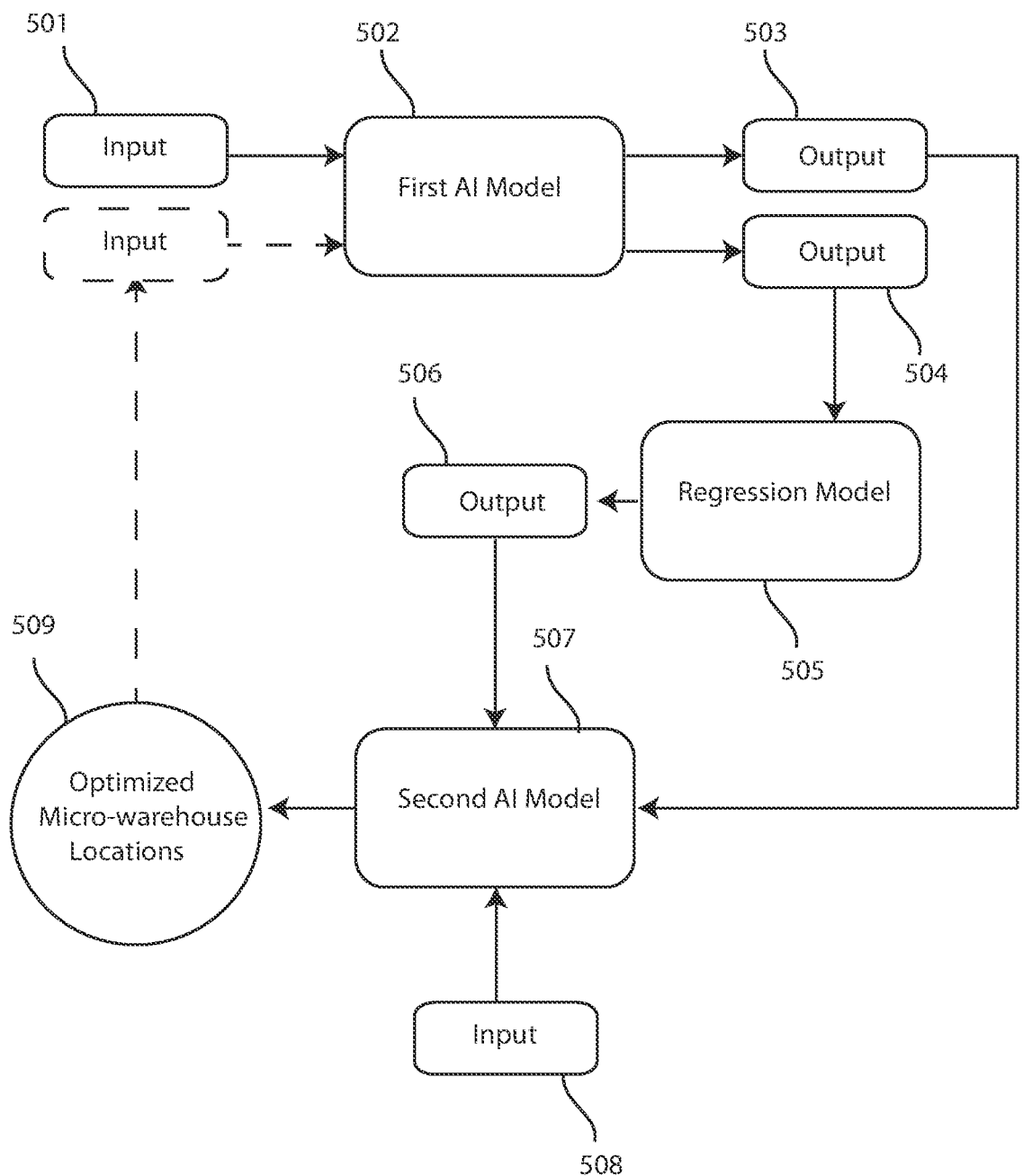
FIG. 7 depicts relationships between a first AI model, a regression model, and a second AI model, in accordance with embodiments of the present invention.

FIG. 7 depicts relationships between a first AI model 502, a regression model 505, and a second AI model 507, in accordance with embodiments of the present invention. An aggregate carbon footprint associated with last-mile deliveries within a geographical region can be reduced with the use of multiple artificial intelligence (AI) models 502, 505, 508. The first AI model 502 forecasts consumer demand for products that could be stocked in temporary pop-up micro-warehouses located within a geographical region, using input 501. The forecast can use a time-series model that demand for products over a specific period of time (see output 503), as demand and seasonality vary with time. One of the outputs 504 of the first AI model includes predictions of likely delivery locations, or clusters of potential delivery locations. The predicted delivery locations within the geographical region output by the first AI model are fed into a regression model 505, for example, employing a Least Square Method (LSM) algorithm to recommend locations of micro warehouses.

The regression model outputs locations for micro-warehouses that are substantially equidistant with respect to a given cluster of delivery notifications, see output 506. The output 506 of the regression model 505 is input into the second AI model 507, along with output 503 from the first AI model 502, and emission-based parameter inputs (input 508) to optimize the locations of the micro-warehouses 509 within the geographical region based on lowering emissions. The emissions-based inputs 508 for the second AI model 507 consider weather information, road conditions, combinations of products and relative location of different end customers, traffic condition, an emission factor for a transport mode, a vehicle category of a user, a type of vehicle, and customer preferences with respect to carbon emissions. The second AI model 507 thus modifies the output 506 of the regression model 505 and outputs optimized locations 509 based on the goal of reducing an aggregate carbon footprint caused by emissions resulting from transportation to and from the temporary micro-warehouses. The optimized locations of the micro-warehouses are dynamically updated by leveraging the multiple AI models using new inputs driven by updated consumer demand over time.

The second trained AI model 507 thus relies on one or multiple outputs of another model to determine locations of micro-warehouses that will reduce a carbon footprint associated with the delivery of packages within a geographical region. In other words, the inputs of the second trained AI model 507 are the outputs of the previous AI models 502, 505 which improve over time after each iteration. By feeding outputs of a first AI model 502 and regression model 505 into a second trained AI model, the second trained AI model 507 is continuously being improved over time, and the modifications to the outputs of the previous models by the second trained AI model 507 are improved.

Moreover, the output 509 of the second trained AI model 507 is fed back into the first trained AI model 502 along with input 501. The output 509 are optimized locations of micro-warehouses based on minimizing carbon footprint that utilizes carbon-based emission parameters and predicted product demand. By feeding the output 509 of the second trained AI model 507 into the first trained AI model 502, the outputs of the first trained AI model 502 and the outputs of the regression model 505 are improved with knowledge of existing optimal locations. Thus, a continuous cycle of machine learning is leveraged to reduce carbon footprints of geographical regions, and can improve over time even as product demand changes.

Training the First AI Model

A training module of code 200 trains the first AI model using supervised machine learning or unsupervised machine learning. In an exemplary embodiment, the model's algorithm is trained to predict product demand over time and to cluster likely delivery locations using user location, user purchase history, product information, seasonal trends, a length of time for the product demand forecast, e-commerce sales data, historical sales transaction data, purchase order history, social media content, government data, click streams, regional event schedules, demand for a product at a given point in time and seasonal trends.

Training the Second AI Model

The second AI model may be trained by supervised machine learning or unsupervised machine learning, implanted via a training module of code 200. In an exemplary embodiment, the model's algorithm is trained to understand what factors reduce or add to carbon emissions for a given delivery route from point A to point B in a given geographical region using a specific type of vehicle. Input samples are fed into one or more neural networks to obtain a first vector and a second vector. An example of a first input sample is a heavy-duty truck, and the second input sample is an emission factor for heavy-duty trucks. Another example of a first input sample is a light-duty passenger vehicle, and the second input sample is an emission factor for light-duty passenger vehicles, which is lower than the emission factor for the heavy-duty truck. Another example of a first input sample is a light-duty passenger vehicle, and the second input sample is a heavy-duty truck. Another example of a first input sample is a road profile indicating highway conditions and the second input sample is a road profile that has stoplights and many intersections. A number between 0 and 1 is calculated using a cosine similarity function of the first vector and the second vector. The number closer to 1 indicates a match between the sample types, and the number closer to 0 indicates that the sample types do not match. A knowledge graph using the relative relationship of the at least two inputs is built and translated into readable text to understand impact on carbon emissions. The inputs can be represented on the knowledge graph, along with the relative relationship to each other. The knowledge graph is translated into machine readable natural language using a natural language generation method based on data of the knowledge graph in the graph form to organize a semantic information of each node of the knowledge graph into a continuous natural language temporary text, which is then translated into the machine readable natural language using a natural language style transfer method. In this way, the second AI model is trained to learn what parameters increase carbon emissions and what parameters reduce carbon emissions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
predicting, by one or more processors of a computer system, using execution of a first trained artificial intelligence model, a product demand of users located in a geographical region over a fixed time period, and delivery location clusters associated with the product demand within the geographical region, wherein
the predicting is based on feeding of input data associated with the users to the first trained artificial intelligence model;
inputting, by the one or more processors, the delivery location clusters into a regression model,
the regression model outputting recommended locations of temporary micro-warehouses within the geographical region based on the delivery location clusters;
training, by the one or more processors, a second artificial intelligence model based on a plurality of emission-based parameters, wherein the training of the second artificial intelligence model comprises:
learning, one or more parameters of the plurality of emission-based parameters that affect an aggregate carbon footprint caused by emissions resulting from transportation to and from the temporary micro-warehouses;
modifying, by the one or more processors, using the second trained artificial intelligence model, the recommended locations based on reducing the aggregate carbon footprint, wherein
the modified recommended locations correspond to optimized locations of the temporary micro-warehouses within the geographical region, and
the second trained artificial intelligence model uses the product demand output by the first trained artificial intelligence model, the recommended locations output from the regression model, and the plurality of emission-based parameters as inputs for the modifying of the recommended locations;
iteratively feeding, by the one or more processors, the optimized locations of the temporary micro-warehouses to the first trained artificial intelligence model along with the input data; and
re-executing the first trained artificial intelligence model based on the input data and the optimized locations of the temporary micro-warehouses, wherein
setting up of the temporary micro-warehouses is performed at the modified recommended locations, and the temporary micro-warehouses are existing structures within the geographical region.

2. The computer-implemented method of claim 1, further comprising:
after the fixed time period expires, leveraging, by the one or more processors, the first trained artificial intelligence model to output a new product demand of the users located within the geographical region and new delivery location clusters;
inputting, by the one or more processors, the new delivery location clusters output by the first trained artificial intelligence model into the regression model, the regression model outputting updated recommended locations of new temporary micro-warehouses within the geographical region; and
using, by the one or more processors, the second trained artificial intelligence model to modify the updated recommended locations and output updated optimized locations based on reducing an aggregate carbon footprint caused by emissions resulting from transportation to and from the new temporary micro-warehouses, wherein the new product demand of the users located in the geographical region output by the first trained artificial intelligence model, the updated recommended locations output from the regression model, and the plurality of emission-based parameters are used as inputs for the second trained artificial intelligence model, wherein the updated optimized locations are different from the optimized locations.

3. The computer-implemented method of claim 2, further comprising:
mapping, by the one or more processors, the optimized locations of the temporary micro-warehouses within a mapping platform to display the optimized locations within the geographical region.

4. The computer-implemented method of claim 3, further comprising:
updating, by the one or more processors, the mapping platform with the updated optimized locations.

5. The computer-implemented method of claim 1, wherein the plurality of emission-based parameters includes road conditions, weather conditions, traffic conditions, an emission factor for a transport mode, a vehicle category of a user of the users, a type of vehicle, and customer preferences with respect to carbon emissions.

6. The computer-implemented method of claim 1, wherein the temporary micro-warehouses are capable of warehousing a product associated with the product demand.

7. The computer-implemented method of claim 1, wherein the fixed time period is selected from the group consisting of one or more days, one or more weeks, one or more months, and one or more years.

8. A computer program product for optimizing locations of temporary micro-warehouses that minimize an aggregate carbon footprint within a geographical region, the computer program product comprising a computer readable hardware storage medium having program instructions embodied therewith, the program instructions readable by one or more processors of a computer system to cause the one or more processors to:
predict, by use a first trained artificial intelligence model, a product demand of users located in the geographical region over a fixed time period, and delivery location clusters associated with the product demand within the geographical region, wherein
the prediction is based on input data associated with the users fed to the first trained artificial intelligence model;
input the delivery location clusters into a regression model, wherein the regression model outputs recommended locations of the temporary micro-warehouses within the geographical region based on the delivery location clusters;

train a second artificial intelligence model based on a plurality of emission-based parameters, wherein the training of the second artificial intelligence model causes the one or more processors to:

learn, one or more parameters of the plurality of emission-based parameters that affect the aggregate carbon footprint caused by emissions that result from transportation to and from the temporary micro-warehouses;

modify, using the second trained artificial intelligence model, the recommended locations based on reduction of the aggregate carbon footprint, wherein the modified recommended locations correspond to optimized locations of the temporary micro-warehouses within the geographical region, and the second trained artificial intelligence model uses the product demand output by the first trained artificial intelligence model, the recommended locations output from the regression model, and the plurality of emission-based parameters as inputs for the modification of the recommended locations;

iteratively feed the optimized locations of the temporary micro-warehouses to the first trained artificial intelligence model along with the input data; and re-execute the first trained artificial intelligence model based on the input data and the optimized locations of the temporary micro-warehouses, wherein the temporary micro-warehouses are set up at the modified recommended locations, and the temporary micro-warehouses are existing structures within the geographical region.

9. The computer program product of claim 8, wherein the program instructions further cause the one or more processors to:

after the fixed time period expires, leverage the first trained artificial intelligence model to output a new product demand of the users located within the geographical region and new delivery location clusters;

input the new delivery location clusters output by the first trained artificial intelligence model into the regression model, the regression model outputs updated recommended locations of new temporary micro-warehouses within the geographical region; and use the second trained artificial intelligence model to modify the updated recommended locations and output updated optimized locations based on reduction of an aggregate carbon footprint caused by emissions from transportation to and from the new temporary micro-warehouses, wherein the new product demand of the users located in the geographical region output by the first trained artificial intelligence model, the updated recommended locations output from the regression model, and the plurality of emission-based parameters are used as inputs for the second trained artificial intelligence model, wherein the updated optimized locations are different from the optimized locations.

10. The computer program product of claim 9, wherein the program instructions further cause the one or more processors to:

map the optimized locations of the temporary micro-warehouses within a mapping platform to display the optimized locations within the geographical region.

11. The computer program product of claim 10, wherein the program instructions further cause the one or more processors to:

update the mapping platform with the updated optimized locations.

12. The computer program product of claim 8, wherein the plurality of emission-based parameters includes road conditions, weather conditions, traffic conditions, an emission factor for a transport mode, a vehicle category of a user of the users, a type of vehicle, and customer preferences with respect to carbon emissions.

13. The computer program product of claim 8, wherein the temporary micro-warehouses are capable of warehousing a product associated with the product demand.

14. The computer program product of claim 8, wherein the fixed time period is selected from the group consisting of one or more days, one or more weeks, one or more months, and one or more years.

15. A computer system, comprising:

one or more computer processors;

one or more computer readable storage media; and computer readable code stored collectively in the one or more computer readable storage media, with the computer readable code including data and instructions to cause the one or more computer processors to perform at least operations comprising:

predicting, using execution of a first trained artificial intelligence model, a product demand of users located in a geographical region over a fixed time period, and delivery location clusters associated with the product demand within the geographical region, wherein the predicting is based on feeding of input data associated with the users to the first trained artificial intelligence model;

inputting the delivery location clusters into a regression model, the regression model outputting recommended locations of temporary micro-warehouses within the geographical region based on the delivery location clusters;

training a second artificial intelligence model based on a plurality of emission-based parameters, wherein the training of the second artificial intelligence model comprises:

learning, one or more parameters of the plurality of emission-based parameters that affect an aggregate carbon footprint caused by emissions resulting from transportation to and from the temporary micro-warehouses;

modifying, using the second trained artificial intelligence model, the recommended locations based on reducing the aggregate carbon footprint, wherein the modified recommended locations correspond to optimized locations of the temporary micro-warehouses within the geographical region, and the second trained artificial intelligence model uses the product demand output by the first trained artificial intelligence model, the recommended locations output from the regression model, and the plurality of emission-based parameters as inputs for the modifying of the recommended locations;

iteratively feeding the optimized locations of the temporary micro-warehouses to the first trained artificial intelligence model along with the input data; and re-executing the first trained artificial intelligence model based on the input data and the optimized locations of the temporary micro-warehouses, wherein
setting up of the temporary micro-warehouses is performed at the modified recommended locations, and
the temporary micro-warehouses are existing structures within the geographical region.

16. The computer system of claim 15, the operations further comprising:
after the fixed time period expires, leveraging the first trained artificial intelligence model to output a new product demand of the users located within the geographical region and new delivery location clusters;
inputting the new delivery location clusters output by the first trained artificial intelligence model into the regression model, the regression model outputting updated recommended locations of new temporary micro-warehouses within the geographical region; and
using the second trained artificial intelligence model to modify the updated recommended locations and output updated optimized locations based on reducing an aggregate carbon footprint caused by emissions resulting from transportation to and from the new temporary micro-warehouses, wherein the new product demand of the users located in the geographical region output by the first trained artificial intelligence model, the updated recommended locations output from the regression model, and the plurality of emission-based parameters are used as inputs for the second trained artificial intelligence model, wherein the updated optimized locations are different from the optimized locations.

17. The computer system of claim 16, the operations further comprising:
mapping the optimized locations of the temporary micro-warehouses within a mapping platform to display the optimized locations within the geographical region.

18. The computer system of claim 17, the operations further comprising:
updating the mapping platform with the updated optimized locations.

19. The computer system of claim 15, wherein the plurality of emission-based parameters includes road conditions, weather conditions, traffic conditions, an emission factor for a transport mode, a vehicle category of a user of the users, a type of vehicle, and customer preferences with respect to carbon emissions.

20. The computer system of claim 15, wherein the temporary micro-warehouses are capable of warehousing a product associated with the product demand.

* * * * *